Dec. 18, 1945.   E. W. VOSE   2,391,048
SPRAYING DEVICE FOR DIVIDED SOLID MATERIALS
Filed Feb. 11, 1943
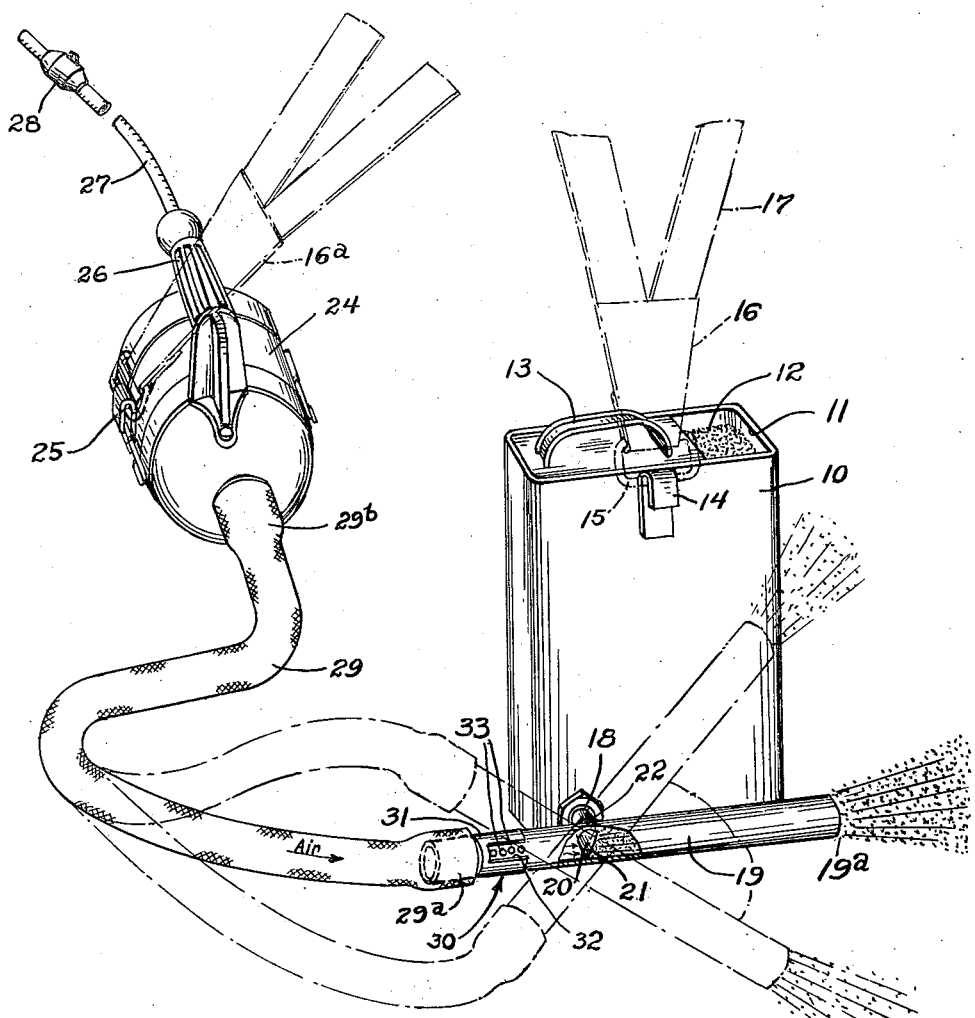
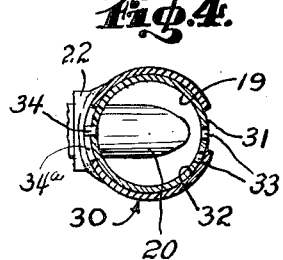
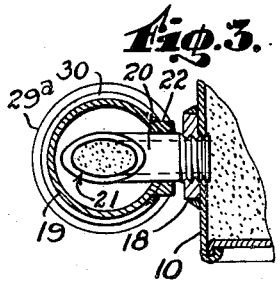
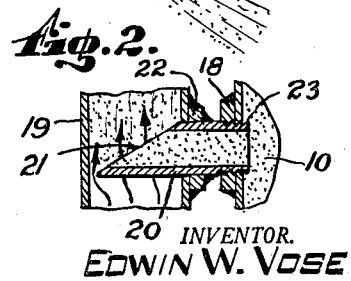
INVENTOR.
EDWIN W. VOSE
BY Van Deventer + Grier
ATTORNEYS Patented Dec. 18, 1945

2,391,048

UNITED STATES PATENT OFFICE 2,391,048

SPRAYING DEVICE FOR DIVIDED SOLID MATERIALS

Edwin W. Vose, Orange, N. J., assignor to Spray Process Co. Inc., New York, N. Y., a corporation of New York Application February 11, 1943, Serial No. 475,472

9 Claims. (Cl. 91—45)

This invention relates to improvements in spraying devices for divided solid materials, and has for a main object the provision of a light weight, portable, and inexpensive device for spraying granules, or the like, upon and/or into cement, waterproofing mastic bases, etc.

A further object of the invention is the provision of a device for spraying solid material having a large volume capacity and thereby enabling a single operator to cover large surfaces rapidly and inexpensively.

Another object of the invention is the provision of a sprayer for granules or the like adapted to deposit said granules on the surface of a binder or waterproof base with sufficient force to tightly bond said granular material to the mastic.

A further object of the invention is the provision of a complete granule spraying outfit, portable by one operator, with a range of operation limited only by an electric cord extending from a standard electric light outlet to a motor driven blower comprising part of the outfit.

Another object of the invention is the provision of a simple, light weight, portable granule sprayer adapted to produce a stream of granules of such diameter, pattern, speed, and percentage of granules to air in the stream that complete coverage of the area is obtained with a minimum waste of granular material.

Other objects of the invention will be apparent to those skilled in the art upon a study of the following specification.

Referring to the drawing—

Figure 1 is a perspective view of my new and improved granule sprayer;

Figure 2 is a cross sectional view showing the passage for conveying granular material from the tank to the air pipe;

Figure 3 is a view similar to that of Figure 2, except that it is taken in a plane at 90° with respect to the plane of Figure 2; and Figure 4 is a cross sectional elevation of the relief valve for controlling the pressure of the air in the air tube.

My improved granular sprayer is intended to be suspended from a strap or other web, in the form of a V-shaped harness, which the operator places about his neck carrying a ring to which and from which the device may be readily connected and disconnected. A similar harness about the operator's neck is also provided for suspending the motor driven blower, as will hereinafter be described. This type of harness has proven very handy in use, because it enables the operator to shift the apparatus around so that it may be manipulated with either the right or the left hand.

Referring now to Figure 1, the new and improved sprayer for divided solid materials includes a container or tank 10 of a convenient size to be supported by the operator. An opening 11 is provided in the top of the tank through which the latter may be filled with granular material 12. The tank may be provided with a handle 13 to facilitate its handling, and is provided with a hook-shaped member 14 which is adapted to engage the ring 15 on the harness 16. The harness includes a loop 17 of web material which the operator may place around his neck.

The tank 10 has an opening formed therein near the bottom thereof, to which is secured in any suitable manner a threaded bushing 18. The threaded interior of this bushing freely communicates with the interior of the tank 10. An air pipe 19 has an opening formed therein and mounted in this opening is a pipe nipple 20 having a beveled face 21 formed thereon. The nipple is secured to the air pipe in any suitable manner, for example by soldering or welding, and a bushing 22 may be provided for reinforcement.

The threaded end 23 of the nipple 21 engages the threads in the threaded bushing 18, and the interior of the nipple 20 freely communicates with material in the tank 10. The beveled face of the nipple is positioned within the air pipe 19 so that it is always facing in the direction of the discharge end 19a of the air pipe.

For supplying air to the air pipe 19, any desired source of air may be used, however, I prefer to use a motor driven blower 24 which consists of a motor and a blower in a common casing. This blower may be provided with a hook 25 for suspension on a suitable harness 16a carried by the operator.

A handle 26 is secured to the casing of the blower to facilitate handling the same. An electric cord 27, which includes a switch 28, may be connected to a source of current. A flexible conduit 29 has one end 29a connected to the air pipe 19, and the other end 29b connected to the blower 24. A relief valve 30 is provided on the air pipe 19 for controlling the quantity of air passing through the pipe 19, and thereby varying the air pressure and speed whereby materials of various sizes and specific gravities may be best sprayed.

This relief valve may consist of a sleeve 31 embracing a portion of the air pipe 19, and this sleeve may have a slot or opening 32 formed therein. The air pipe itself may have a series of holes 33, or any other desired shaped opening, formed therein within the span of the sleeve 31.

A stop screw 34 extends through a slot 34ᵃ in the sleeve 31 and threadedly engages the air pipe 19 for defining limits to the movement of the sleeve 31. Such limits might be from no opening to the atmosphere to a maximum opening.

The operator may hang the tank 10 on the harness 16, and the motor driven blower on the harness 16ᵃ, in such a manner that the tank is suspended immediately in front and the blower is suspended in back of the operator. This enables the operator to steady the tank with his left hand and to manipulate the air pipe 19 with his right hand.

As soon as current is supplied to the blower 24 (by operating the switch 28), air passes through the air pipe 19 and exits through the end 19ᵃ. The air passing through the pipe 19 creates a partial vacuum in front of the beveled surface 21 of the nipple 20, and granules or other divided solid materials in the tank 10 flow from said tank and via said nipple 20 to this area of reduced pressure. Here the material is picked up or entrained by the stream of air passing through the pipe 19, and the air and the entrained material may be applied to the work by directing the nozzle end 19ᵃ of the air pipe 19 toward the surface to be treated. The relief valve 30 may be adjusted to control the air passing through the pipe 19, and this control is effected in accordance with the type of granular or finely divided material being handled.

It was pointed out above that the nipple 20 is fixed in the air pipe 19 in such manner that the beveled face 21 always faces the nozzle end 19ᵃ of the air pipe. This being the case, the operator may swing the air pipe upwardly or downwardly from the horizontal, in accordance with where the work being treated is located with respect to the operator. For example, the air pipe 19 may be pointed substantially vertical when work is to be done on a ceiling. It has been found that the threads 23 on the nipple 20 allow sufficient movement of the air pipe 19 without appreciable leakage. A modification of this arrangement contemplates providing a swivel joint between the tank 10 and the nipple 20.

My new and improved sprayer for granulated or other finely divided solids, is light in weight and will deliver a volume as great as can be used by the operator; for example, I have been able to process 100 square feet in less than ten minutes. The working range of my new and improved granule sprayer is only limited by the length of the electric cord connected to the motor driven blower. The device will handle materials of various characteristics, all the way from granulated cork (which is very light in weight) to powdered iron pyrites (which is very heavy).

I have found that the principal reasons that attempts, in the prior art, to spray granulated solids have been unsuccessful are because, (1) high pressure air jets produce an air stream of high velocity and very low volume; this results in a poor entrainment of the materials, and, therefore, said materials are deposited on the surface being treated in intermittently heavy and thin groupings. (2) No provision has been made for varying and controlling the air pressure so that various sizes and weights of granules may be deposited on the prepared surface at the proper speed (with the proper impact). If the speed is too great, the granules may be driven entirely into the mastic base and covered up; but if the speed is too low, they may strike the surface so lightly that they do not adhere properly, or satisfactorily cover the surface.

I employ a large volume of air at a comparatively low pressure. For example, my pressure may run from two ounces to the square inch up to five pounds to the square inch.

Now, due to the fact that I handle a large volume of air at a low pressure, I am enabled, by means of my relief valve 30, to vary the pressure and volume of air through a wide range and make settings in accordance with the weight and size of the granules so as to deliver them to the mastic or other surface with just the proper impact to correctly deposit said granules thereon.

By the use of a large volume of air at a low pressure, I am enabled to obtain such a degree of entrainment and mixing of the granules with the air that the resultant deposit of granules on the surface being treated is substantially uniform.

The expressions "a source of air of moderate pressure" or "a source of air of large volume and low pressure" may be taken to mean a source of air in comparatively large volume and at a pressure of from between two ounces to five pounds to the square inch.

Although I have herein shown and described by way of example a preferred embodiment of the invention, it must be understood that many changes may be made in the arrangement herein shown and described without departing from the spirit of the invention as defined in the following claims.

What is claimed is:

1. In apparatus for spraying divided solid material, in combination, a portable tank or container for said material having a filler opening formed in the top thereof, a hole formed in said tank near the bottom thereof, a threaded nut secured to said tank with its hole concentric with the hole formed in said tank, injector means having one end rotatively and threadedly engaging the hole in said nut and communicating with the interior of said tank, a nozzle mounted on said injector means and having its interior communicating with the interior of said injector means, and means for supplying a stream of air to said nozzle, thereby causing the material from said tank to pass into said nozzle via said injector means and to become entrained in said stream of air.

2. In apparatus for spraying divided solid material, in combination, a portable tank or container for said material having a filler opening formed therein, engageable means on said container adapted to be engaged by and supported on a harness worn by the operator, an injector tube extending through and rotatably mounted in a wall of said container having one end communicating with the interior of the container and its other end outside said container and beveled, a nozzle fixedly supported on said last end of said injector tube with the beveled end directed toward the discharge end of said nozzle, and means for supplying a stream of air to said nozzle for causing said material to pass from said container into said nozzle via said injector tube and to become entrained in said stream of air.

3. In apparatus for spraying divided solid material, in combination, a portable tank or container for said material having a filler opening formed therein, a nozzle, an injector tube having one end extending into said nozzle with a beveled exit formed thereon directed toward the discharge end of said nozzle, said injector tube being fixed to said nozzle in this relation, the other end of said injector tube communicating with the interior of said container near the bottom thereof, swivel means connecting said tube to said container thereby permitting said nozzle to be moved to a plurality of angular positions.

4. Apparatus for spraying divided solid material including, a portable tank or container for said material, and a spray nozzle having an injector tube rigidly connected thereto and journaled in one wall of said container with said injector tube communicating with said material, and means for passing a stream of low pressure air of substantial volume through said nozzle and causing said material to be delivered to the air stream via said injector tube, whereby said nozzle and said injector tube may be moved on the axis of said tube for directing the spray of said material in any one of a plurality of directions relative to said container.

5. Apparatus for spraying divided solid material including, a portable tank or container for said material having a filler opening formed therein, a spray nozzle having an injector tube connected thereto and journaled in one wall of said container with said injector tube communicating with said material and its beveled exit end always facing the discharge end of said nozzle, said nozzle and said tube being bodily movable about the axis of said tube, means connecting said spray nozzle to a source of air of moderately low pressure, and a relief valve on said nozzle between said injector tube and the end of said nozzle which is connected to said source for regulating the pressure of air in said nozzle.

6. In apparatus for spraying divided solid material, in combination, a portable tank or container for said material having a filler opening formed therein, engageable means on said container adapted to be engaged by and supported on a harness worn by the operator, a nozzle swiveled on the exterior of said tank, injector means having one end communicating with the interior of said container near the bottom thereof, and the other end communicating with the interior of the nozzle, said last end having a beveled face directed toward the discharge end of said nozzle, a source of air of moderate pressure, a connection between said source and the inlet end of said nozzle for supplying a stream of air to said nozzle and causing said material to pass from said container into said nozzle via said injector means and to become entrained in said stream of air, and a relief valve adjacent to the inlet end of said nozzle for controlling the pressure of the air therein.

7. In apparatus for spraying divided solid material, in combination, a tank or container for said material having a filler opening formed in the top thereof, and a spray nozzle carried thereon, said nozzle including; a main tube having a substantially uniform internal diameter, having an inlet end adapted to be connected to a source supplying a large volume of air at a low pressure and having a discharge end adapted to be directed toward the work, an injector tube journaled in and having one end in communication with material in said tank, and having its other end beveled or mitered and fixedly positioned in said nozzle with its mitered surface facing the discharge end of said nozzle, the midpoint of said mitered surface substantially coinciding with the axis of said nozzle, whereby said material is entrained and uniformly mixed with the air stream passing through said nozzle and is deposited on the surface being treated in circular areas of substantially uniform thickness throughout.

8. In apparatus for spraying divided solid material, in combination, a portable tank or container for said material having a filler opening formed in the top thereof, a threaded hole formed in a wall of said container near the bottom thereof, a tubular member threadedly engaging said threaded hole and having its interior communicating with said material, a bevel formed on the other end of said tubular member, a tubular nozzle having a radial hole formed therein, the beveled end of said tubular member being fixedly positioned within said nozzle with the midpoint of its beveled exit coinciding substantially with the axis of said nozzle and facing the discharge end of said nozzle, and means connecting a source of air to the inlet end of said nozzle, the engagement of said tubular member with the threaded hole in said tank permitting the operator to move said nozzle angularly about the axis of said tubular member for directing the spray in a plurality of directions.

9. In apparatus for spraying divided solid material, a container for said material, a tubular nozzle having an inlet end and an outlet end, means connecting said inlet end to a source of air capable of delivering a large volume thereto at a low pressure and forming an air stream thereto, said outlet end adapted to be directed toward the work, said nozzle including an injector tube intermediate said ends and under the influence of said air stream for delivering said material from the container to the interior of said nozzle, and settable pressure relief means on said nozzle between said inlet end and the point where said injector tube enters said nozzle for allowing a greater or less quantity of air to escape to the atmosphere and thereby vary the pressure and volume of said air in accordance with the nature of the material being handled.

EDWIN W. VOSE.